(12) United States Patent
Vora et al.

(10) Patent No.: US 6,470,299 B1
(45) Date of Patent: Oct. 22, 2002

(54) PROBABILISTIC PRIVACY PROTECTION

(75) Inventors: Poorvi L. Vora, Corvallis, OR (US);
Verna E. Knapp, Monmouth, OR (US);
Umesh V. Vazirani, Berkeley, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 121 days.

(21) Appl. No.: 09/705,469

(22) Filed: Nov. 2, 2000

(51) Int. Cl.[7] .................................................. G06F 3/02
(52) U.S. Cl. ........................................ 702/186; 702/188
(58) Field of Search .............................. 702/186, 188; 705/3, 7, 15

(56) References Cited

U.S. PATENT DOCUMENTS 6,321,263 B1 * 11/2001 Luzzi et al. ................. 709/224
6,356,859 B1 * 3/2002 Talbot et al. ............... 702/188

OTHER PUBLICATIONS

Goals of the NymIP Effort [online] Available: http://nymip.velvet.com/cvs/general/goals.html [Mar. 14, 2001].

Thy NymIP Effort [online] Available: http://nymip.velvet.com/ [Mar. 14, 2001].

Principles For Standardization and Interoperability in Web–based Digital Rights Management [online] Available: http://www.w3.org/2000/12/drm–ws/pp/hp–erickson.html [Mar. 13, 2001].

Untraceable Electronic Mail, Return Addresses, and Digital Pseudonyms [online] Available: http:world.std.com/ franl/crypto/chaum–acr–1981.html [Mar. 13, 2001].

Intel Nixes Chip–Tracking ID [online] Available: http://www.wired.com/news/politics/0,1283,35950,00.html [Mar. 13, 2001].

SafeNet 2000: Security and Privacy Leaders Gather at Microsoft Campus to Seek Solutions To Chanllenges Facing Internet USers [online] Available: http://www.microsoft.com/PressPass/features/2000/dec00/12–07safenet.asp [Mar. 13, 2001].

RealNetworks in Real Trouble [online] Available: http://www.wirednews.com/news/politics/0,1283,32459,00.html [Mar. 13, 2001].

David Chaum, "Achieving Electronic Privacy", Scientific American, Aug. 1992, pp. 96–101.

Kenneth C. Laudon, "Markets and Privacy", Communications of the ACM, Sep. 1996/vol. 39, No. 9, pp. 92–104.

Julie E. Chohen, "A Right To Read Anonymously: A Closer Look At "Copyright Management" In Cyberspace", Originally published 28, Conn. L. Rev. 981 (1996).

Nabil R. Adam and John C. Wortmann, "Security–Control Methods For Statistical Databases: A Comparative Study", ACM Computing Surveys, vol. 21, No. 4, Dec. 1989, pp. 515–556.

Jan Schlorer, "Security of Statistical Databases: Multidimensional Transformaion", ACM Transactions on Database Systems, vol. 6, No. 1, Mar. 1981, pp 95–112.

George T. Duncan and Sumitra Mukherjee, "Optimal Disclosure Limitation Strategy In Statistical Databases: Deterring Tracker Attacks Through Addititive Noise", Jun. 16, 1998, [Online] Available: http://duncan.heinz.cmu.edu/GeorgeWeb.

* cited by examiner

Primary Examiner—Marc S. Hoff
Assistant Examiner—Felix Suarez

(57) ABSTRACT

Information about activities is gathered. Performed activities are monitored and recorded. Each recording of a performed activity has an accuracy level. The accuracy level indicates a probability level that any particular recorded activity accurately records a performed activity. Random selection of activities from a list of activities is used to inaccurately record some performed activities.

24 Claims, 3 Drawing Sheets

PROBABILISTIC PRIVACY PROTECTION

BACKGROUND

The present invention concerns gathering usage information and pertains particularly to providing privacy protection using probabilistic accumulation of data.

Effective marketing often requires an understanding of the history and habits of individuals or groups to which a product or other object is being marketed. However, many consumers value their privacy and are reluctant to provide information themselves or to have their activities monitored.

One reason consumers-are hesitant to provide information or to be monitored is because they fear that gathered information may be used inappropriately. Even though those who gather information may promise to hold in confidence obtained information; nevertheless, consumers often do not have complete trust that information collected about them will not be misused.

It is desirable therefore to provide some mechanism that allows collection of information that is useful to marketers but protects the privacy of individuals.

SUMMARY OF THE INVENTION

In accordance with the preferred embodiments of the present invention, information about activities is gathered. Performed activities are monitored and recorded. Each recording of a performed activity has an accuracy level. The accuracy level indicates a probability level that any particular recorded activity accurately records a performed activity. Random selection of activities from a list of activities is used to inaccurately record some performed activities.

For example, the performed activities include monitoring accesses of sites through a network or using a network to purchase products. In the preferred embodiment, a user is allowed to select the accuracy level. Recordings of the performed activities are aggregated with recordings of other performed activities to obtain aggregated information.

The present invention allows gathering of information while retaining a degree of privacy. Because the information is not always true, individual pieces of information are not worth much. However, when aggregated with other information, the aggregated information can be useful. The accuracy of the aggregated information depends on the probability of individual answers being true. If the individual answers have a higher probability of truth, the aggregated answers provide r results closer to the true probability.

Because individual pieces of information may be untrue, the information is valuable only in aggregation. Hence, data collectors are required to aggregate information to generate useful information.

DESCRIPTION OF THE PREFERRED EMBODIMENT

Figure 1:
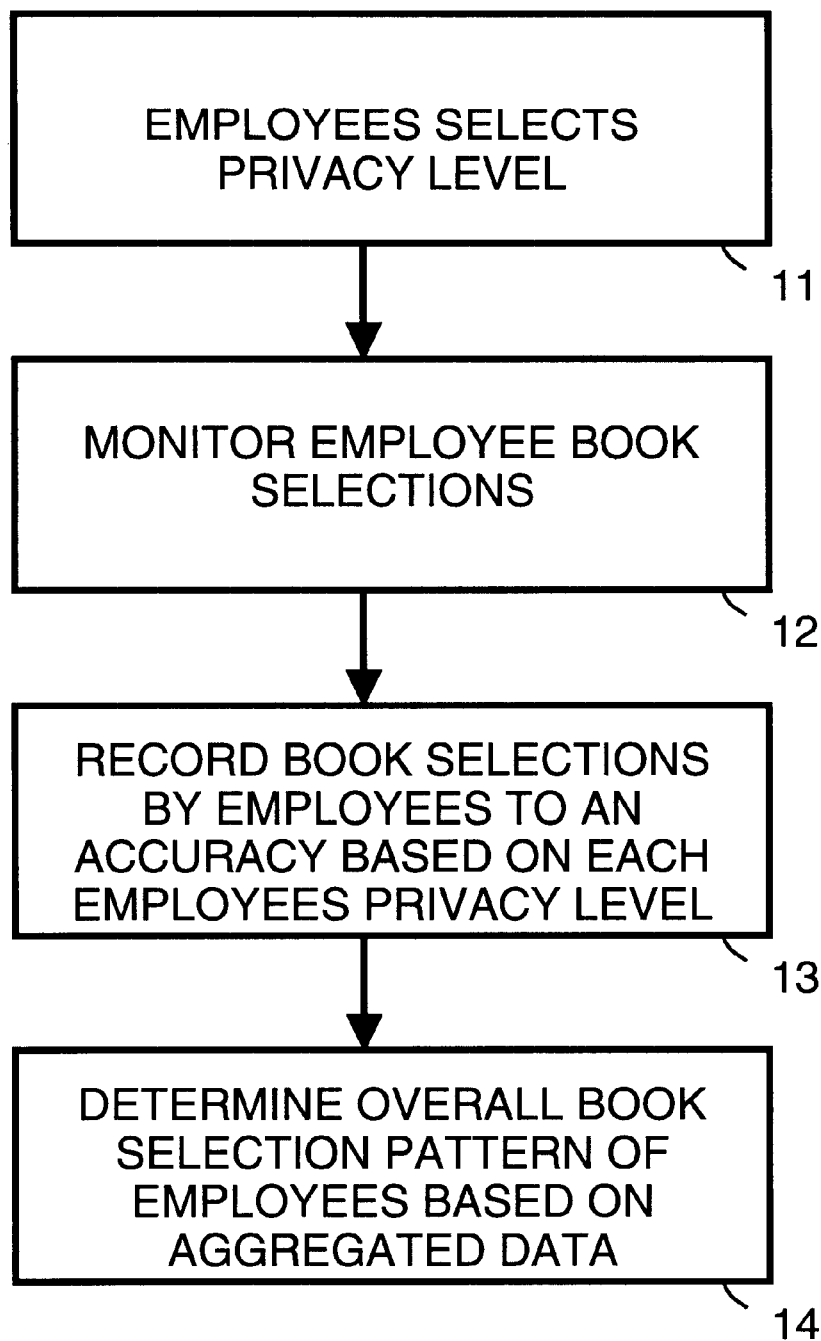
FIG. 1 is a flowchart that illustrates monitoring book selections by employees in accordance with a preferred embodiment of the present invention.

The present invention allows gathering statistical information about the activities of clients while allowing the clients to choose levels of protection in return for levels of compensation.

In one preferred embodiment of the present invention, a program residing on a client's computer monitors client activities. When recording the activities, however, the truth is not always recorded. In the preferred embodiment of the present invention, the probability that any recorded activity actually occurred is greater than the probability that a recorded activity did not occur (distantly related to a survey technique purportedly used in surveying potential AIDS patients where a surveyor requested the person being surveyed to "roll a die, tell me a lie if you roll a one, the truth otherwise, and don't tell me what you rolled"). In general, the higher the probability, the less privacy afforded the client, but the more valuable the information to an information gatherer.

For example, each time the client performs an activity, the program selects at random one activity from a list of all possible activities. The random selection is weighted so that the probability of choosing the activity actually performed is greater than the probability of choosing some other activity. The randomly selected activity is the one reported to a server that is gathering information on activities.

Reported information from several clients is aggregated. Provided enough information is aggregated, it is possible to calculate an approximation to the true activity rates of all the clients as a group. Over a period of time, the frequency of activities reported will approach the actual frequencies of the activities. Since it takes a large number of activities reported to accurately calculate the true activity rates, the activities reported by a large number of clients must be aggregated to get useable results. This means that a client no longer has to trust the information gatherer to average the results over many users. The information gatherer has to aggregate data in order to get accurate information. To further improve privacy, reporting can be skewed so that averaging over only a single client does not result in statistical accuracy. This is done, for example, by biasing the reporting from each client so that averaging over different clients averages out the bias.

In another embodiment of the present invention, a server can observe the activities of a group of users and choose to sometimes accurately record the activities performed, and sometimes to inaccurately record which activities were performed. The probability of recording the correct activity is higher than the probability of recording some other activity. For example, the server is internal to a workgroup and only the activity of the workgroup as a whole is reported to an information gatherer. Alternatively, a server is at a distributor site and gathers and reports information so that the distributor protects client privacy while selling information about the clients.

Calculated activity patterns can be sold or otherwise made available to commercial interests without disclosing the identities of the clients. This is valuable information, and the clients or the servers can bargain for a price reduction or for other compensation in return. This compensation can depend on the probability with which accurate information is provided. The higher the probability of accurate information, the more valuable is each individual piece of information. However, the higher the probability of accurate information, the more intrusive to a client is the disclosure of recorded information .

For example, FIG. 1 illustrates the case where book selections employed by a company are monitored. In this example, employees of the company order books online from many book suppliers. Perhaps one of the book suppliers arranges to become an exclusive provider of workrelated books to employees in exchange for a discount. However, the book supplier requires information about the reading habits of the employees of the company. FIG. 1 illustrates how this information can be obtained while still providing for the protection of the privacy of each employee.

In a step 11, each employee selects a privacy level. The higher the privacy level, the less accurate the information recorded about a particular employee's activities.

How often accurate (verses inaccurate) information is recorded about each book purchase made by an employee is determined by the selected privacy level. Given the probability with which accurate information is recorded, a random number generator decides when accurate information will be recorded. For example, an employee selects one of the following accuracy levels: 0.6, 0.65, 0.7, 0.75, 0.85, 0.95. An accuracy level of 0.6 indicates that 60% of the time an employee's book selection is recorded accurately and 40% of the time the employee's book selection is recorded inaccurately. An accuracy level of 0.65 indicates that 65% of the time an employee's book selection is recorded accurately and 35% of the time the employee's book selection is recorded inaccurately. And so on.

In a step 12, a server through which the employees order books monitors each employee's accesses to online bookstores. For example the server includes a master list of books which employees can select to order.

In a step 13, each time an employee selects a book to order, information about the book purchase is recorded. The privacy level selected by the employee determines the accuracy of the recorded information. For example, if an employee has selected an accuracy level of 0.7, 70% of the time the employee's book selection is recorded accurately. That means 30% of the time the employee's book selection is recorded inaccurately. An inaccurate record, for example, results in another book selected at random from the master list of books to be recorded as ordered, instead of the book actually ordered by the employee.

In a step 14, ordering information (both accurate and inaccurate records) are aggregated for all employees to determine an overall pattern of book selection. In this way, a relative accurate summary of employee book selection can be determined in such a way that the privacy of individual employees is protected.

Figure 2:
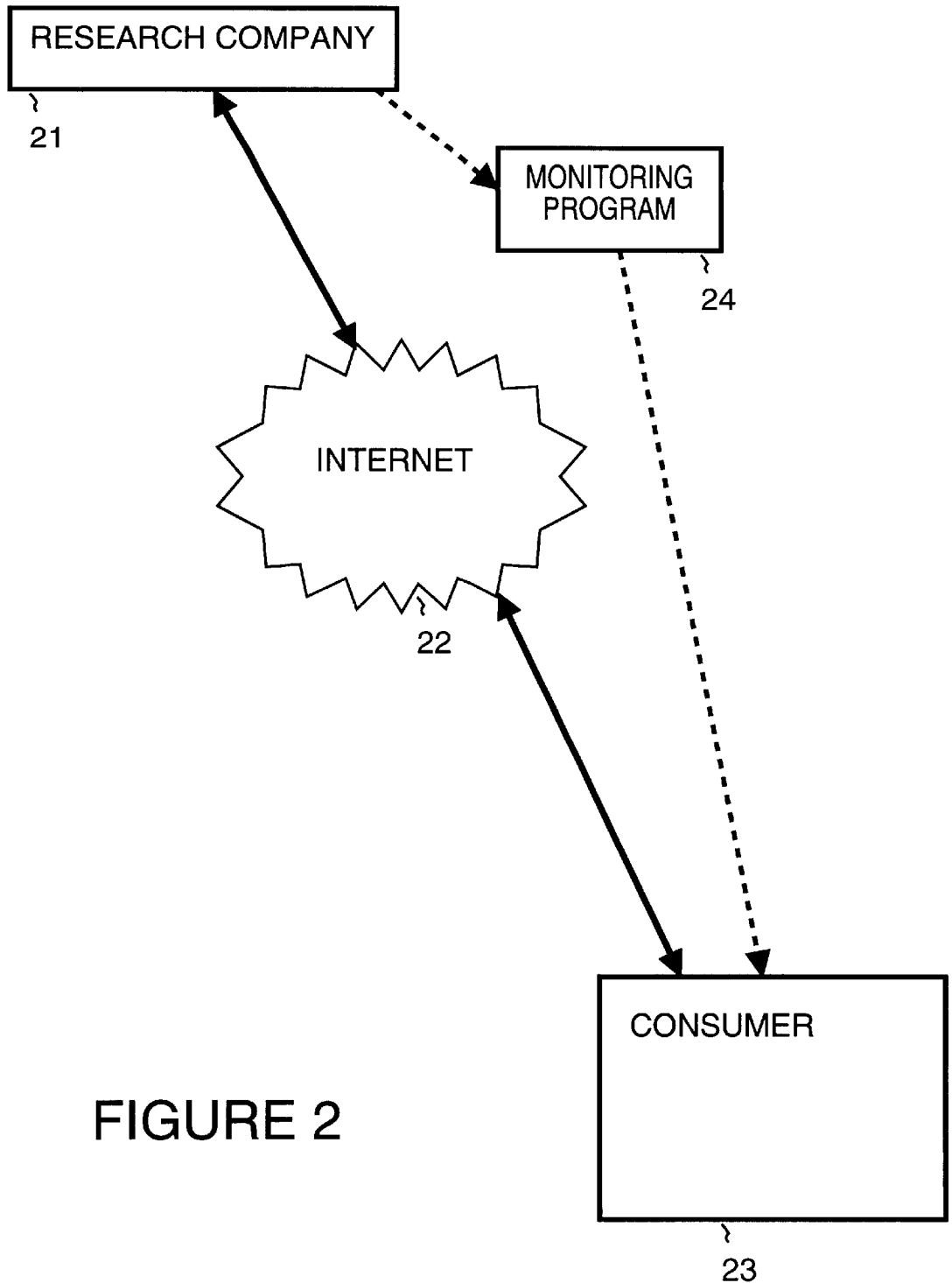
FIG. 2 and FIG. 3 are block diagrams that illustrate tracking web site access in accordance with a preferred embodiment of the present invention.
Figure 3:
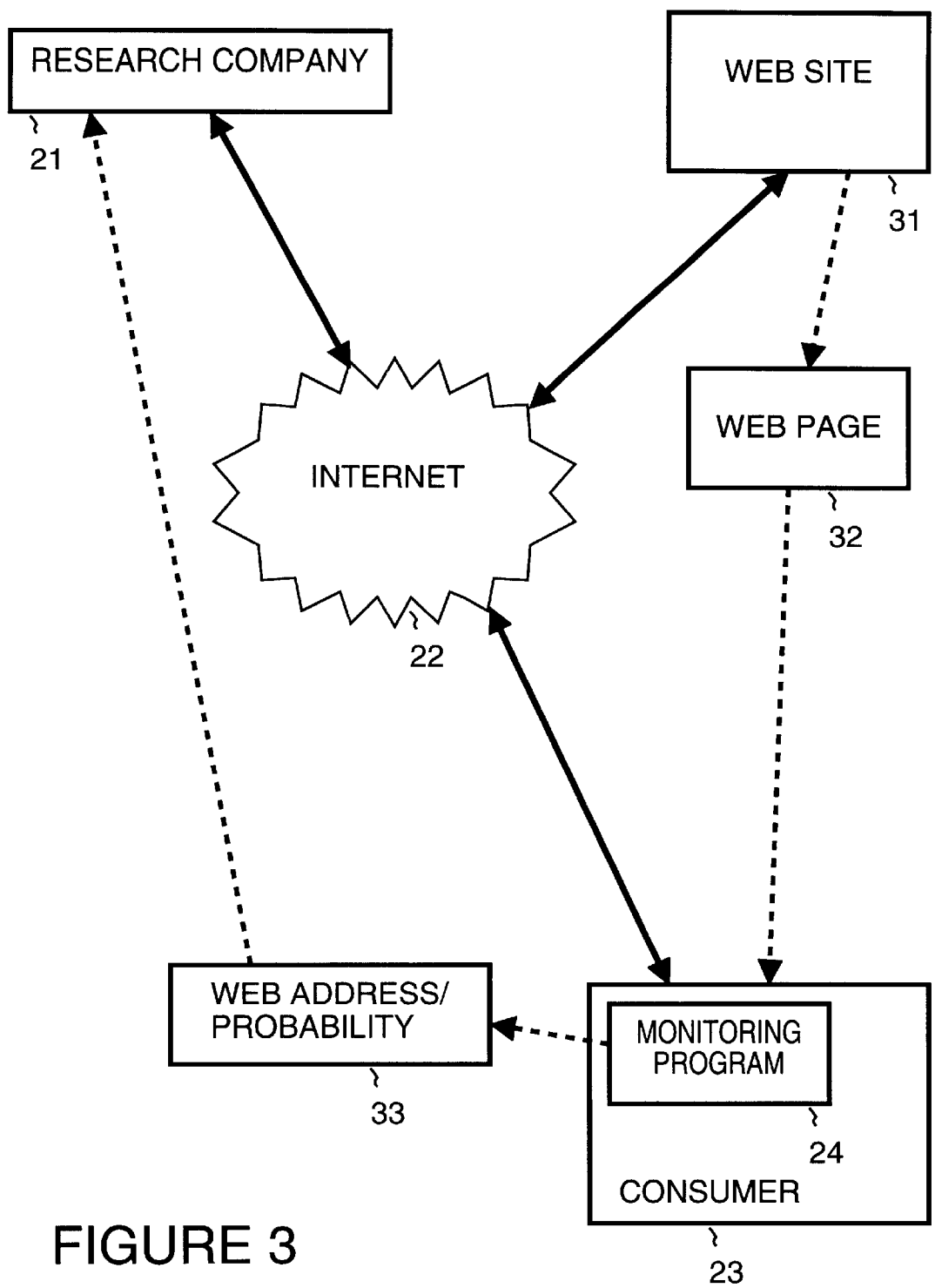

FIG. 2 and FIG. 3 are block diagrams that illustrate tracking web site access in accordance with an alternative preferred embodiment of the present invention.

For example, research company 21 offers to pay consumers for information about their browsing habits. To protect the privacy individual consumers while gathering information, consumers download a special monitoring program. This is illustrated in FIG. 2 by a consumer 23 downloading, through the internet 22, a monitoring program 24 from research company 21. Alternatively, the monitoring program 24 is installed upon consumer's computer when the computer is purchased, or is sent to the consumer on a CD or disk. For example, monitoring program 24 allows a consumer to choose a privacy setting. The available privacy settings are, for example, highly private, very private, private, moderately private, disclosure, serious disclosure. Each setting corresponds, for example, to the following probabilities of truth: 0.6, 0.65, 0.7, 0.75, 0.85, 0.95. The probability of truth decreases with an increase in the privacy setting. In various embodiments, different numbers of privacy levels may be chosen as well as different probabilities for selected privacy levels.

Alternatively, monitoring program 24 may designate a privacy level and probability of truth without allowing a client selection.

As illustrated by FIG. 3, every time consumer 23 accesses a web site, monitoring program 24, running on a computer system utilized by consumer 23, monitors the access. The privacy level selected determines the accuracy of the recorded information. For example, if an accuracy level of 0.75 has been selected, 75% of the time the address of the web site is recorded accurately. That means 25% of the time the address of the web site is recorded inaccurately. An inaccurate record, for example, results in another web site address selected at random from a list of available web sites is recorded as being accessed, instead of the web site actually accessed. This is implemented in monitoring program 24, for example, using a random number generator.

Each time a web site is addressed, a report is forwarded to research company 21. Alternatively, periodically, monitoring program 24 reports a number of addressed web sites. For example, monitoring program 24 may forward information to research company 21 at set periods, or may forward information to research company 21 after a predetermined number of web sites have been accessed.

Web site access and reporting is illustrated in FIG. 3 by consumer 23 utilizing internet 22 to access a web page 32 from a web site 31. As a result of the access, monitoring program 24 forwards through the internet 22 to research company 21 a report 33 that includes a web address and a probability that the web address is the web address of the web site actually accessed. This report is done, for example, immediately after access of web site 31, or alternatively, as part of a report of several web accesses.

Research company 21 averages the information it gets from many consumers to obtain information about web browsing habits. The accuracy of the results obtained by the market research company depend on the number and accuracy level of recorded accessed web sites.

Because results with higher accuracy levels are more valuable, research company 21 can choose to compensate consumers based on the selected privacy level. Higher privacy levels (and lower accuracy) results in lower compensation because more individual responses need to be averaged to obtain meaningful results. For example, compensation is in the form of discounts at certain online or physical stores. Alternatively, compensation can be in the form of "digital cash", goods, services, credits at certain organizations, refunds to credit card accounts, or checks sent to the consumer's home.

In order to provide additional protection to consumers, personal information obtained about consumers can also be recorded with a known amount of inaccuracy. Personal information includes, for example, age, color of eyes and hair, race, income level marriage status, number of children and so on. How often accurate (verses inaccurate) information is recorded is also determined by the selected privacy level. Given the probability with which accurate information is recorded, a random number generator decides when accurate information will be recorded. For example, for an accuracy level of 0.8 indicates that 80% of the time personal information is recorded accurately and 20% of the time personal information is recorded inaccurately.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A computer implemented method for gathering information about activities, the method comprising the following steps:
   (a) monitoring performed activities; and,
   (b) recording the performed activities, so that each recording of a performed activity has an accuracy level, the accuracy level indicating a probability level that any particular recorded activity accurately records a performed activity, including the following substep:
      (b.1) using random selection of activities from a list of activities to inaccurately record some performed activities.

2. A computer implemented method as in claim 1, wherein in step (b) the performed activities include monitoring accesses of sites through a network.

3. A computer implemented method as in claim 1, wherein in step (b) the performed activities include using a network to purchase products.

4. A computer implemented method as in claim 1, additionally comprising the following step performed before step (a):
   allowing a user to select the accuracy level.

5. A computer implemented method as in claim 1, additionally comprising the following steps performed before step (a):
   allowing a user to select the accuracy level; and,
   determining a compensation level for the user based on the accuracy level.

6. A computer implemented method as in claim 1, additionally comprising the following step:
   recording personal information about a user that performs the performed activities, including the following substep:
      using random selection to inaccurately record some of the personal information.

7. A computer implemented method as in claim 1, additionally comprising the following step performed after step (b):
   aggregating recordings of the performed activities with recordings of other performed activities to obtain aggregated information about the performed activities and the other performed activities.

8. A computer implemented method as in claim 7, wherein steps (a) and (b) are performed by a computing system used by a consumer for performing the performed activities, and the aggregating step is performed in a computing system used by an information gatherer.

9. A method for gathering information about activities, the method comprising the following steps:
   (a) running, within a computing system, a monitoring program, the monitoring program performing the following substeps:
      (a.1) monitoring performed activities, and
      (a.2) recording the performed activities, so that each recording of a performed activity has an accuracy level, the accuracy level indicating a probability level that any particular recorded activity accurately records a performed activity, including the following substep:
         (a.2.1) using random selection of activities from a list of activities to inaccurately record some performed activities.

10. A method as in claim 9, wherein in substep (a.2) the performed activities include monitoring accesses of sites through a network.

11. A method as in claim 9, wherein in substep (a.2) the performed activities include using a network to purchase products.

12. A method as in claim 9, wherein in step (a) the monitoring program additionally performs the following substep before performing substep (a.1):
   allowing a user to select the accuracy level.

13. A method as in claim 9, wherein in step (a) the monitoring program additionally performs the following substeps before performing substep (a.1):
   allowing a user to select the accuracy level; and,
   determining a compensation level for the user based on the accuracy level.

14. A method as in claim 9, wherein in step (a) the monitoring program additionally performs the following substep:
   recording personal information about a user that performs the performed activities, including the following substep:
      using random selection to inaccurately record some of the personal information.

15. A method as in claim 9, wherein in step (a) the monitoring program additionally performs the following substep after performing substep (a.2):
   sending recordings of the performed activities to an information gatherer.

16. A method as in claim 9 additionally comprising the following step performed by the information gatherer:
   (b) aggregating recordings of the performed activities with recordings of other performed activities to obtain aggregated information about the performed activities and the other performed activities.

17. A system for gathering information about activities, the system comprising:
   a monitoring program running within a client computing system, the monitoring program monitoring performed activities and recording the performed activities, so that each recording of a performed activity has an accuracy level, the accuracy level indicating a probability level that any particular recorded activity accurately records a performed activity; and,
   an information gathering system, the information gathering system aggregating recordings of the performed activities with recordings of other performed activities to obtain aggregated information about the performed activities and the other performed activities.

18. A system as in claim 17, wherein the information gathering system uses random selection of activities from a list of activities to inaccurately record some performed activities.

19. A system as in claim 17, wherein the performed activities include monitoring accesses of sites through a network.

20. A system as in claim 17, wherein the performed activities include using a network to purchase products.

21. A system as in claim 17, wherein the monitoring program allows a user to select the accuracy level.

22. A system as in claim 17, wherein the monitoring program allows a user to select the accuracy level and a compensation level for the user is based on the accuracy level.

23. A system as in claim 17, wherein the monitoring program records personal information about a user that performs the performed activities, the monitoring program using random selection to inaccurately record some of the personal information.

24. A system as in claim 17, wherein the monitoring program sends the recordings of the performed activities to the information gathering system.

* * * * *